(12) United States Patent
Harvey et al.

(10) Patent No.: US 12,520,446 B2
(45) Date of Patent: *Jan. 6, 2026

(54) METHOD AND APPARATUS FOR GENERALIZED CONTROL OF DEVICES

(71) Applicant: PassiveLogic, Inc., Salt Lake City, UT (US)

(72) Inventors: Troy Aaron Harvey, Salt Lake City, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/635,676

(22) Filed: Apr. 15, 2024

(65) Prior Publication Data

US 2024/0284627 A1    Aug. 22, 2024

Related U.S. Application Data

(63) Continuation of application No. 18/209,383, filed on Jun. 13, 2023, now Pat. No. 12,108,556, which is a
(Continued)

(51) Int. Cl.
*H05K 7/14*    (2006.01)
*F24F 11/32*    (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC .................................. G06F 8/51; G05B 15/02
(Continued)

(56) References Cited

U.S. PATENT DOCUMENTS 4,353,653 A    10/1982    Zimmerman
5,208,765 A    5/1993    Turnbull
(Continued)

FOREIGN PATENT DOCUMENTS

CN    103926912 A    7/2014
CN    206002869 U    3/2017
(Continued)

OTHER PUBLICATIONS

Yi, Zili, et al. "Dualgan: Unsupervised dual learning for image-to-image translation." Proceedings of the IEEE international conference on computer vision. 2017. pp. 2849-2857. (Year: 2017).*
(Continued)

*Primary Examiner* — Satish Rampuria

(57) ABSTRACT

Tools and techniques are described to attach a device to a controller, whereby the controller analyzes the device inputs, looks up information about the device in a database, and then determines which inputs on the device match the defined device inputs. It then may translate information received from the device into an intermediate language. It may also use the information received from the device, the location of the device, and information about the device to create a digital twin of the device.

20 Claims, 10 Drawing Sheets

Related U.S. Application Data continuation of application No. 17/410,072, filed on Aug. 24, 2021, now Pat. No. 11,737,231.

(60) Provisional application No. 63/070,460, filed on Aug. 26, 2020.

(51) Int. Cl.

| | | |
|---|---|---|
| F24F 11/49 | (2018.01) | |
| F24F 11/63 | (2018.01) | |
| F24F 11/88 | (2018.01) | |
| G01R 31/55 | (2020.01) | |
| G05B 13/02 | (2006.01) | |
| G05B 15/02 | (2006.01) | |
| G05B 19/048 | (2006.01) | |
| G05B 23/02 | (2006.01) | |
| G06F 1/3209 | (2019.01) | |
| G06F 1/3246 | (2019.01) | |
| G06F 3/041 | (2006.01) | |
| G06F 3/0482 | (2013.01) | |
| G06F 3/04847 | (2022.01) | |
| G06F 3/147 | (2006.01) | |
| G06F 8/41 | (2018.01) | |
| G06F 8/51 | (2018.01) | |
| G06F 8/53 | (2018.01) | |
| G06F 8/74 | (2018.01) | |
| G06F 9/4401 | (2018.01) | |
| G06F 30/12 | (2020.01) | |
| G06F 30/13 | (2020.01) | |
| G06F 30/18 | (2020.01) | |
| G06F 30/392 | (2020.01) | |
| G06F 111/04 | (2020.01) | |
| G06F 111/16 | (2020.01) | |
| G06F 113/04 | (2020.01) | |
| G06F 113/16 | (2020.01) | |
| G06F 115/12 | (2020.01) | |
| G06Q 30/0283 | (2023.01) | |
| H02J 3/00 | (2006.01) | |
| H04B 3/46 | (2015.01) | |
| H04L 43/50 | (2022.01) | |
| H04L 67/12 | (2022.01) | |
| H04L 67/125 | (2022.01) | |
| H04L 67/75 | (2022.01) | |
| H04M 3/30 | (2006.01) | |
| H04W 4/80 | (2018.01) | |
| H04W 84/00 | (2009.01) | |

(52) U.S. Cl.
CPC ............ *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/04186* (2019.05); *G06F 3/0482* (2013.01); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
USPC .......................................................... 717/137
See application file for complete search history.

(56) References Cited

U.S. PATENT DOCUMENTS

| | | |
|---|---|---|
| 5,530,643 A | 6/1996 | Hodorowski |
| 6,275,962 B1 | 8/2001 | Fuller et al. |
| 6,301,341 B1 | 10/2001 | Gizara et al. |
| 6,437,692 B1 | 8/2002 | Petite et al. |
| 6,606,731 B1 | 8/2003 | Baum et al. |
| 6,645,066 B2 | 11/2003 | Gutta et al. |
| 6,813,777 B1 | 11/2004 | Weinberger et al. |
| 6,891,838 B1 | 5/2005 | Petite et al. |
| 7,102,502 B2 | 9/2006 | Autret |
| 7,248,603 B1 | 7/2007 | Grunkemeyer et al. |
| 7,304,855 B1 | 12/2007 | Milligan et al. |
| 7,578,135 B2 | 8/2009 | Mattheis |
| 7,587,250 B2 | 9/2009 | Coogan et al. |
| 7,729,882 B2 | 6/2010 | Seem |
| 7,734,572 B2 | 6/2010 | Wiemeyer et al. |
| 7,835,431 B2 | 11/2010 | Belge |
| 7,917,232 B2 | 3/2011 | McCoy et al. |
| 8,024,054 B2 | 9/2011 | Mairs et al. |
| 8,099,178 B2 | 1/2012 | Mairs et al. |
| 8,503,943 B2 | 8/2013 | Spanhake |
| 8,628,239 B2 | 1/2014 | Merrow et al. |
| 8,643,476 B2 | 2/2014 | Pinn et al. |
| 8,749,959 B2 | 6/2014 | Riley et al. |
| 8,782,619 B2 | 7/2014 | Wu et al. |
| 8,925,358 B2 | 1/2015 | Kasper |
| 9,441,847 B2 | 9/2016 | Grohman |
| 9,521,724 B1 | 12/2016 | Berry et al. |
| 9,544,209 B2 | 1/2017 | Gielarowski et al. |
| 9,602,301 B2 | 3/2017 | Averitt |
| 9,664,400 B2 | 5/2017 | Wroblewski et al. |
| 9,671,777 B1 | 6/2017 | Aichele et al. |
| 9,678,494 B2 | 6/2017 | Hyde et al. |
| 9,740,385 B2 | 8/2017 | Fadell et al. |
| 9,791,872 B2 | 10/2017 | Wang et al. |
| 9,857,238 B2 | 1/2018 | Malhotra et al. |
| 9,860,961 B2 | 1/2018 | Chemel et al. |
| 9,952,573 B2 | 4/2018 | Sloo et al. |
| 10,042,730 B2 | 8/2018 | Zebian |
| 10,094,586 B2 | 10/2018 | Pavlovski et al. |
| 10,223,721 B1 | 3/2019 | Bhatia |
| 10,334,758 B1 | 6/2019 | Ramirez et al. |
| 10,455,002 B2 * | 10/2019 | Satkunarajah ...... G06F 3/04817 |
| 10,512,143 B1 | 12/2019 | Ikehara et al. |
| 10,528,016 B2 | 1/2020 | Noboa |
| 10,557,889 B2 | 2/2020 | Montoya et al. |
| 10,558,183 B2 | 2/2020 | Piaskowski et al. |
| 10,558,248 B2 | 2/2020 | Adrian |
| 10,627,124 B2 | 4/2020 | Walser et al. |
| 10,640,211 B2 | 5/2020 | Whitten et al. |
| 10,672,293 B2 | 6/2020 | Labutov et al. |
| 10,687,435 B2 | 6/2020 | Adrian et al. |
| 10,736,228 B2 | 8/2020 | Kho et al. |
| 10,761,516 B2 | 9/2020 | Sinha et al. |
| 10,892,946 B2 | 1/2021 | Costa et al. |
| 10,900,489 B2 | 1/2021 | Rendusara et al. |
| 10,942,871 B2 | 3/2021 | Cawse et al. |
| 10,943,444 B2 | 3/2021 | Boyd et al. |
| 10,966,068 B2 | 3/2021 | Tramiel et al. |
| 10,966,342 B2 | 3/2021 | Lairsey et al. |
| 10,969,133 B2 | 4/2021 | Harvey |
| 11,005,870 B2 | 5/2021 | Yan et al. |
| 11,073,976 B2 | 7/2021 | Park et al. |

(56) References Cited

U.S. PATENT DOCUMENTS

| | | |
|---|---|---|
| 11,088,989 B2 | 8/2021 | Gao et al. |
| 11,119,882 B2 | 9/2021 | Rakshit |
| 11,131,473 B2 | 9/2021 | Risbeck et al. |
| 11,164,159 B2 | 11/2021 | Ma et al. |
| 11,262,741 B2 | 3/2022 | Strand et al. |
| 11,269,306 B2 | 3/2022 | Risbeck et al. |
| 11,294,254 B2 | 4/2022 | Patterson et al. |
| 11,353,853 B2 | 6/2022 | Sinha et al. |
| 11,385,613 B2 | 7/2022 | Ludwig et al. |
| 11,468,408 B2 | 10/2022 | Ma et al. |
| 11,677,576 B2 | 6/2023 | Thakur et al. |
| 11,733,663 B2 | 8/2023 | Bhattacharya et al. |
| 2004/0236547 A1 | 11/2004 | Rappaport et al. |
| 2005/0010421 A1 | 1/2005 | Watanabe et al. |
| 2005/0040247 A1 | 2/2005 | Pouchak |
| 2007/0096902 A1 | 5/2007 | Seeley et al. |
| 2007/0162288 A1 | 7/2007 | Springhart et al. |
| 2008/0277486 A1 | 11/2008 | Seem et al. |
| 2009/0189764 A1 | 7/2009 | Keller et al. |
| 2009/0195064 A1 | 8/2009 | Joseph et al. |
| 2010/0025483 A1 | 2/2010 | Hoeynck et al. |
| 2010/0083222 A1* | 4/2010 | Maximilien ............ G06F 8/20 717/121 |
| 2010/0131933 A1 | 5/2010 | Kim et al. |
| 2011/0087988 A1 | 4/2011 | Ray et al. |
| 2011/0125930 A1 | 5/2011 | Tantos et al. |
| 2012/0102472 A1 | 4/2012 | Wu et al. |
| 2012/0221986 A1 | 8/2012 | Whitford et al. |
| 2012/0233595 A1 | 9/2012 | Ghanathe et al. |
| 2014/0088772 A1 | 3/2014 | Lelkens |
| 2014/0101082 A1 | 4/2014 | Matsuoka et al. |
| 2014/0215446 A1 | 7/2014 | Araya et al. |
| 2014/0277757 A1 | 9/2014 | Wang et al. |
| 2014/0358291 A1 | 12/2014 | Wells |
| 2014/0364985 A1 | 12/2014 | Tiwari et al. |
| 2015/0081928 A1 | 3/2015 | Wintzell et al. |
| 2015/0154018 A1* | 6/2015 | Zhang ................ G06Q 10/06 717/120 |
| 2015/0198938 A1 | 7/2015 | Steele et al. |
| 2015/0234381 A1 | 8/2015 | Ratilla et al. |
| 2016/0016454 A1 | 1/2016 | Yang et al. |
| 2016/0054712 A1 | 2/2016 | McFarland et al. |
| 2016/0062753 A1 | 3/2016 | Champagne |
| 2016/0073521 A1 | 3/2016 | Marcade et al. |
| 2016/0086242 A1 | 3/2016 | Schafer et al. |
| 2016/0088438 A1 | 3/2016 | O'Keeffe |
| 2016/0092427 A1 | 3/2016 | Bittmann |
| 2016/0132308 A1 | 5/2016 | Muldoon |
| 2016/0195856 A1 | 7/2016 | Spero |
| 2016/0205784 A1 | 7/2016 | Kyle et al. |
| 2016/0209868 A1 | 7/2016 | Hartman et al. |
| 2016/0295663 A1 | 10/2016 | Hyde et al. |
| 2017/0075323 A1 | 3/2017 | Shrivastava et al. |
| 2017/0097259 A1 | 4/2017 | Brown et al. |
| 2017/0131611 A1 | 5/2017 | Brown et al. |
| 2017/0176034 A1 | 6/2017 | Hussain et al. |
| 2017/0230930 A1 | 8/2017 | Frey |
| 2017/0322579 A1 | 11/2017 | Goparaju et al. |
| 2017/0365908 A1 | 12/2017 | Hughes et al. |
| 2018/0005195 A1 | 1/2018 | Jacobson |
| 2018/0046173 A1 | 2/2018 | Ahmed |
| 2018/0075168 A1 | 3/2018 | Tiwari et al. |
| 2018/0089172 A1 | 3/2018 | Needham |
| 2018/0123272 A1 | 5/2018 | Mundt et al. |
| 2018/0202678 A1 | 7/2018 | Ahuja et al. |
| 2018/0266716 A1 | 9/2018 | Bender et al. |
| 2018/0307781 A1 | 10/2018 | Byers et al. |
| 2018/0356969 A1 | 12/2018 | Narain et al. |
| 2019/0017719 A1 | 1/2019 | Sinha et al. |
| 2019/0025809 A1 | 1/2019 | Bhattacharya et al. |
| 2019/0041829 A1 | 2/2019 | Sinha et al. |
| 2019/0087076 A1 | 3/2019 | Dey et al. |
| 2019/0138704 A1 | 5/2019 | Shrivastava et al. |
| 2019/0156443 A1 | 5/2019 | Hall |
| 2019/0173109 A1 | 6/2019 | Wang |
| 2019/0258747 A1 | 8/2019 | Milev |
| 2019/0294018 A1 | 9/2019 | Shrivastava et al. |
| 2019/0377306 A1 | 12/2019 | Harvey |
| 2020/0003444 A1 | 1/2020 | Yuan et al. |
| 2020/0018506 A1 | 1/2020 | Ruiz et al. |
| 2020/0050161 A1 | 2/2020 | Noboa |
| 2020/0133257 A1 | 4/2020 | Cella et al. |
| 2020/0142365 A1 | 5/2020 | Sharma et al. |
| 2020/0150508 A1 | 5/2020 | Patterson et al. |
| 2020/0167066 A1 | 5/2020 | Park et al. |
| 2020/0167442 A1 | 5/2020 | Roecker et al. |
| 2020/0169574 A1 | 5/2020 | Yan et al. |
| 2020/0183374 A1 | 6/2020 | Fries et al. |
| 2020/0183717 A1 | 6/2020 | Deutsch et al. |
| 2020/0187147 A1 | 6/2020 | Meerbeek et al. |
| 2020/0221269 A1 | 7/2020 | Tramiel et al. |
| 2020/0226223 A1 | 7/2020 | Reichl |
| 2020/0228759 A1 | 7/2020 | Ryan et al. |
| 2020/0233389 A1 | 7/2020 | Ma et al. |
| 2020/0233391 A1 | 7/2020 | Ma et al. |
| 2020/0233680 A1 | 7/2020 | Ma et al. |
| 2020/0234220 A1 | 7/2020 | Ma et al. |
| 2020/0255142 A1 | 8/2020 | Whitten et al. |
| 2020/0279482 A1 | 9/2020 | Berry et al. |
| 2020/0285203 A1 | 9/2020 | Thakur et al. |
| 2020/0285788 A1 | 9/2020 | Brebner |
| 2020/0287786 A1 | 9/2020 | Anderson et al. |
| 2020/0288558 A1 | 9/2020 | Anderson et al. |
| 2020/0342526 A1 | 10/2020 | Ablanczy |
| 2020/0348038 A1 | 11/2020 | Risbeck et al. |
| 2020/0348662 A1 | 11/2020 | Cella et al. |
| 2020/0379730 A1 | 12/2020 | Graham et al. |
| 2020/0387041 A1 | 12/2020 | Shrivastava et al. |
| 2020/0387129 A1 | 12/2020 | Chandaria |
| 2021/0011444 A1 | 1/2021 | Risbeck et al. |
| 2021/0048797 A1 | 2/2021 | Sinha et al. |
| 2021/0055716 A1 | 2/2021 | Turner |
| 2021/0073441 A1 | 3/2021 | Austern et al. |
| 2021/0081504 A1 | 3/2021 | Mccormick et al. |
| 2021/0081880 A1 | 3/2021 | Bivins et al. |
| 2021/0096975 A1 | 4/2021 | Deluca et al. |
| 2021/0109837 A1 | 4/2021 | Rakshit |
| 2021/0157312 A1 | 5/2021 | Cella et al. |
| 2021/0182660 A1 | 6/2021 | Amirguliyev et al. |
| 2021/0193334 A1 | 6/2021 | Turrin et al. |
| 2021/0366793 A1 | 11/2021 | Hung et al. |
| 2021/0383041 A1 | 12/2021 | Harvey et al. |
| 2021/0397770 A1 | 12/2021 | Bompard et al. |
| 2021/0400787 A1 | 12/2021 | Abbo et al. |
| 2022/0058497 A1 | 2/2022 | Vazquez-Canteli et al. |
| 2022/0066754 A1 | 3/2022 | Harvey et al. |
| 2022/0070293 A1 | 3/2022 | Harvey et al. |

FOREIGN PATENT DOCUMENTS

| | | |
|---|---|---|
| CN | 206489622 U | 9/2017 |
| JP | 6301341 B2 | 3/2018 |
| WO | 2008016500 A3 | 3/2008 |
| WO | 2012019328 A1 | 2/2012 |

OTHER PUBLICATIONS

Kudo, Taku. "Subword regularization: Improving neural network translation models with multiple subword candidates." arXiv preprint arXiv:1804.10959 (2018). pp. 1-10. (Year: 2018).*

Lin, Jianxin, et al. "Conditional image-to-image translation." Proceedings of the IEEE conference on computer vision and pattern recognition. 2018. pp. 5524-5532. (Year: 2018).*

Zhang et al., Information modeling for cyber-physical production system based on digital twin and AutomationML. The international journal of advanced manufacturing technology, 107(3)1927-1945. (Year:2020).

Amin, Massoud, "Toward self-healing energy infrastructure systems," IEEE Computer Applications in Power 14.1 (2002): pp. 20-28.

BigLadder Software Full Ref, Occupant Thermal Comfort: Engineering Reference, 2014, The Board of Trustees of the University of

(56) References Cited

OTHER PUBLICATIONS

Illinois and the Regents of the University of California through the Ernest Orlando Lawrence Berkeley National Laboratory (Year: 2014).
Brour, Mourad, and Abderrahim Benabbou. "Atlas Lang MTS 1: Arabic text language into Arabic sign language machine translation system." Procedia computer science 148 (2019): pp. 236-245. (Year: 2019).
De Meester et al., SERIF:A Semantic ExeRcise Interchange FormatConference: Proceedings of the 1st International Workshop on LINKed EDucation, Oct. 2015.
Divay, Michael, and Anthony J. Vitale, "Algorithms for grapheme-phoneme translation for English and French: Applications for database searches and speech synthesis." Computational linguistics 23.4 (1997) pp. 495-523 (Year: 1997).
Gou, Wendi, and Mengchu Zhou, "An emerging technology for improved building automation control," 2009, IEEE International Conference on Systems, Man and Cybernetics, IEEE, 2009, pp. 337-342.
Gou, Wendy et al., "Wireless mesh networks in intelligent building automation control: a survey." International Journal of Intelligent Control and Systems, vol. 16, No. 1, Mar. 2011, 28-36.
Gungor et al., "Industrial Wireless Sensor Networks: Challenges, Design Principles, and Technical Approaches," IEEE Transactions on Industrial Electronics, vol. 56, No. 10, Oct. 2009.
Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.
Hernandez, et al., "A Domain-Specific Language for Real-time Dynamical Systems Emulation on a Microcontroller." Studies in Informatics and Control 28.4 (2019): pp. 453-462. (Year: 2019).
Kalagnanam et al., "A System for Automated Mapping of Bill-of_Materials Part Numbers", KDD '04: Proceedings of the tenth ACM SIGKDD international conference on Knowledge discovery and data mining, Aug. 2004, pp. 805-810.

Kastner, Wolfgang, et al., "Building Automation System Integration into the Internet of Things, The IoT6 Approach, Its Realization and Validation," Proceedings of the 2014 IEEE Emerging Technology and Factory Automation (ETFA), IEEE, 2014, pp. 1-9 (Year:2014).
Ngyuyen et al., "IoTSan: Fortifying the Safety of IoT Systems." Proceedings of the 14th International Conference on Emerging Networking Experiments and Technologies. 2018, pp. 191-203. (Year: 2018).
Ouf et al., Effectiveness of using WiFi technologies to detect and predict building occupancy, Sust. Buildi. 2, 7 (2017).
Serale, G., et al.,"Model Predictive Control (MPC) for Enhancing Building and HVAC System Energy Efficiency: Problem Formulation, Applications and Opportunities," Energies 2018, 11, 631; doi:10.3390, Mar. 12, 2018.
Shaalan, Khaled. "Rule-based approach in Arabic natural language processing." The International Journal on Information and Communication Technologies (IJ ICT) 3.3 (2010): pp. 11-19. (Year: 2010).
Shailendra, Eshan et al., "Analyzing home automation and networking technologies," IEEE Potentials 37.1 (2018): pp. 27-33, (Year: 2018).
Siano, P, "Demand response and smart grids—A survey", Renewable and Sustainable Energy Reviews 30 (2014) 461-478.
Svenonius, Elaine, "Compatibility of retrieval languages. Introduction to a Forum." KO Knowledge Organization 10.1 (1982): pp. 2-4. (Year: 1983).
U.S. Appl. No. 15/995,019 (7340.2.2) Office Action mailed Jul. 26, 2019.
U.S. Appl. No. 15/995,019 (7340.2.2) Office Action mailed Oct. 8, 2020.
U.S. Appl. No. 15/995,019 (7340.2.2) Office Action mailed Apr. 15, 2020.
Wang et al., "A Practical Multi-Sensor Cooling Demand Estimation Approach Based on Visual Indoor and Outdoor Information Sensing," Sensors 2018, 18, 3591; doi:10.3390.

\* cited by examiner

METHOD AND APPARATUS FOR GENERALIZED CONTROL OF DEVICES

RELATED APPLICATION

The present application is a continuation of U.S. patent application Ser. No. 18/209,383, which is a continuation of U.S. patent application Ser. No. 17/410,072, filed on Aug. 24, 2021, which claims priority to, U.S. Provisional Patent Application Ser. No. 63/070,460, filed Aug. 26, 2020, the entire disclosures of which are hereby incorporated by reference for all purposes.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to creation of a digital twin version of a device. More specifically, a controller translating multiple device languages into an intermediate language on the fly.

BACKGROUND

Building systems are the world's most complicated systems. Even the smallest buildings easily have thousands of I/O points—or degrees of freedom. In large buildings the I/O points can exceed hundreds of thousands, and with the growth of the IoT industry, the complexity is only growing. Only once we give buildings their due respect against comparative cyberphysical systems like autonomous vehicles, Mars rovers, or industrial robotics, can we start the conversation on what we do to address the complexity.

In addition to managing this rising system complexity and evolving customer demand, there is exponential growth in the diversity of applications and use cases. Using workarounds to solve this exploding complexity is more than insufficient. As not only systems (such as HVAC systems) need to be modeled, but also the architectural and engineering workflow, more than tags, more that labels, and more than even interconnections must be used. Not only must hydronic and air flows between mechanical equipment be described, but the data flow within and between IT and IoT systems must also be characterized. Not only do the building systems need to be connected to the structural elements, but so do the interconnected business systems within—whether that is the processes of occupants, logistics, manufacturing, energy, or any of the myriad services that must be integrated with the building.

In spite of all the complexity, almost all building controls today are model-free. The model-free approach, while simple to implement, becomes quite difficult to manage and optimize as the complexity of the system increases. It also lacks the inherent self-knowledge to provide new approaches to programming, such as provided by model-driven graphical programming, or to govern the interconnections between components and sub-system synergistics. Digital model based approaches to date have been limited in scope and specific to known models defined a-priori. They have thus lacked the ability to enable users to create complex systems of interconnected building zones by ad hoc means, use simple graphical user interfaces to define a system, or enable a thermodynamic digital system model to evolve its control optimization and commissioning over time in situ. However, even when one has developed a thermodynamic digital system model, it can be very difficult to translate the computer version into a version that can be understood by a human. If the simulation is just a black box of equations, then it is very difficult, if not impossible, to understand how computer actions map to human understandable actions.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In an innovative embodiment a method of translating device inputs into an intermediate internal language of a controller is disclosed. This includes connecting at least one device input of a device to an input of the controller, the device being a genre of device; the controller determining device input characteristics; from a database associated with the controller, retrieve information about characteristics of input of the genre of device; and using the device input characteristics and information about characteristics of the genre of device, translating the at least one device input into an intermediate internal language.

In embodiments, the method further discloses using information from the database associated with the controller and the device input characteristics, creating a digital twin representation of the device.

In embodiments, the digital twin representation comprises an actor type assigned to the device.

In embodiments, the digital twin representation comprises a quanta type, and wherein the quanta type interacts with the actor type.

In embodiments, the characteristics of the genre of device input comprises a wired protocol, a wireless protocol, a semantic protocol or an electrical protocol.

In embodiments, the semantic protocol comprises BACnet, Modbus, KNX, N2, 1-wire, or an internal protocol associated with the controller.

In embodiments, the electrical protocol comprises DC, AC, Dry contact, Current, Frequency, Duty Cycle, Common, Ground, or virtual.

In embodiments, the current comprises voltage amount.

In embodiments, the quanta type comprises fluid, thermal, mechanical, fuels, Control, or Data.

In embodiments, a controller is disclosed. This controller includes computer hardware and memory, the controller operationally able to control a device, the device with an input which is operationally able to attach to the controller; a determiner which determines device input characteristics upon the device being attached to the controller; a database associated with the controller, the database with information about a genre of the device; and an intermediate internal language translator which is operationally able to use the device input characteristics determined by the determiner and information about the genre of the device retrieved from the database to translate device information into an intermediate internal language.

In embodiments, the controller is operationally able to use the device input characteristics determined by the determiner and information about the genre of the device retrieved from the database to create a digital twin representation of the device.

In embodiments, the controller includes a display screen, and wherein the display screen is operationally able to accept information about the device.

In embodiments, the database associated with the controller is operationally able to accept information from the display screen about the device.

In embodiments, the digital twin representation comprises an actor type assigned to the device, a quanta type, assigned to the device and a location attached to the device.

In embodiments, the location attached to the device is a location which the device will affect.

In embodiments, actor type assigned to the device comprises a produce, a consumer, a transformer, a transporter, a store, a router, a mixer, a path, a branch, or data.

In embodiments, the digital twin representation comprises a quanta type assigned to the device, the quanta type comprising fluid, thermal, mechanical, fuels, control, and information.

In embodiments, the quanta type of information comprises control data that converts user inputs into data or sensor data that converts physical properties into data.

In embodiments, a non-transitory computer readable storage medium storing instructions for creating a intermediate language representation of a device input when the instructions is disclosed which, when executed by a processor, cause the processor to perform steps including: connecting at least one device input of a device to an input of a controller with a processor and memory, the device being a genre of device; the controller determining device input characteristics; from a database associated with the controller, retrieve information about characteristics of the genre of device input; and using the device input characteristics and the information about the characteristics of the genre of device input, translating the device input into an intermediate internal language.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
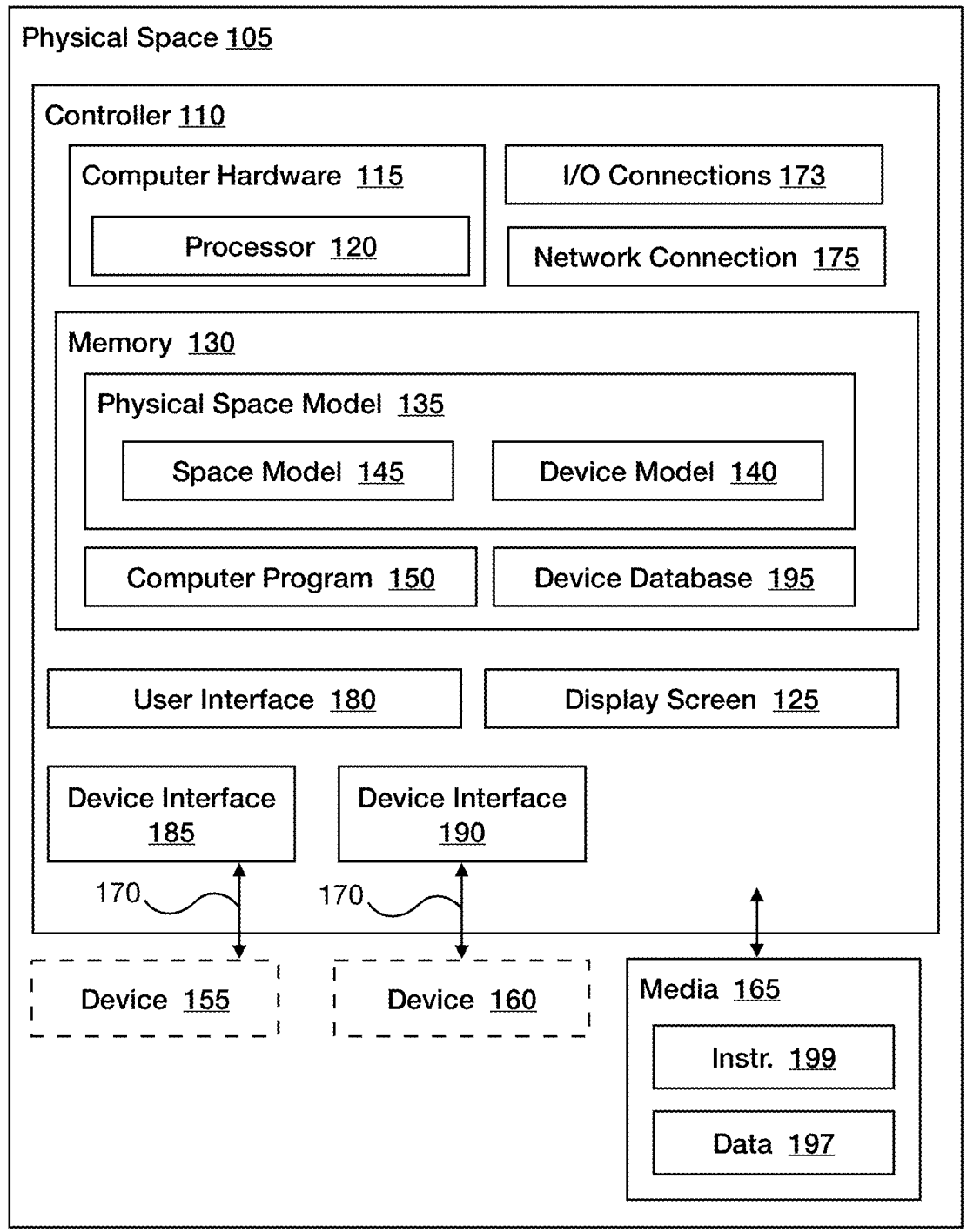
FIG. 1 depicts a functional block diagram showing an exemplary embodiment of a semantic lowering system in conjunction which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the FIGURES may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to point mapping interfaces. In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments."one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example", or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

In addition, it is appreciated that the figures provided herewith are for explanation purposes to persons ordinarily skilled in the art and that the drawings are not necessarily drawn to scale. Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include) one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

"Method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense). "Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as providing an interface be able to translate the language of diverse pieces of equipment into a common language. This common language can be used to easily translate what devices are doing into human language, making assembling reports, viewing existing behavior, and, by translating back into specific device language, directing machine usage using a human-language interface.

I. Overview

With systems and methods described herein, one or more inputs on a device can be attached to a controller. Once the device has been attached, the controller can turn the device on and off, and send information of various types to the device that allows the controller to determine the behavior of the inputs when responding to various types of data. The information about the signals can be used to determine which input is what on the device (when multiple inputs), allowing a user to hook up a device with multiple inputs without designating which is which. Among the information about the device that is stored (e.g., within a database associated with the controller) may include attachment information, physics equations that define the equipment behavior, the objects (e.g., water, air, electricity, data, physical objects such as parts, etc.) that the device moves, information about the device's location and/or the location that the device will affect. For example, a furnace may be in a basement, but may heat air in building zones on the first floor. In such a case, the location of the boiler may be the first floor zones.

Using this information, a digital twin of the device may be constructed, and placed within an existing digital twin program, eg., of the area that the controller controls, etc. In some embodiments, the digital twin itself may be created using this information. With this added information from the new device, the new model may be run to improve the control paradigm. This may allow the controller to more efficiently control the physical space that the controller controls, such that significant energy savings can be provided. It also allows physical spaces to more efficiently understand errors that occur with a system, more efficiently fix errors, understand the system, and allow epiphenomena arising from systems of any complexity (that are otherwise near-impossible to capture) to be studied and understood.

The underlying framework of existing and currently proposed building standards are largely semantic standards. They ask the question "what is my name?" In contrast, a true ontology that understands a building system at a deep level asks "who am I?" One is a linguistic question, the other an existential one. What is the difference? Simply put, if I know you have a "pump" in English, I can label it. If we both agree that pumps are labeled "pump" and have a format, I can tag it. If we agree on an interconnect scheme I can define a system topology. Yet for all this effort, a system still doesn't know what a "pump" actually is or what it does. And without this you can't autonomously control it, optimize it, or use it to learn new information that arises out of system behavior.

However, by defining object existentials using their underlying physics (e.g., a chair equals a device that prevents objects from falling from a certain height), meaningful purpose in context can be imputed to specific object application and control. Using such a physics format, and imputing the object purposes, a digital twin of the system may be constructed. One concept used in the creation of digital twins is that of "actor." Actors may be the role a piece of equipment takes in a system. If a system understands what actors are, it may be able to discern the purpose of equipment, and how to orchestrate the system. Actors may be of various types, such as producer, consumer, transporter, store, etc. For example, aa buffer tank has the actor role of "store". Other stores are batteries (stores electricity), sand beds (store heat) and flash drives (store data). Another actor type is "transport." A transport moves substance from one place to another. Pumps move water, fans move air, and conveyers move boxes—yet they all do the same role, that of "transport" within their respective systems, and therefore have the actor type "transport."

The counterpart to the actors are quanta. Digital twins as described herein also include Quanta. Quanta are the packets of substance exchanged between actors. The transported objects described above, e.g., water, air, boxes, etc., for example, are quanta. An actor of type "producer" may change the nature of quanta that is input. For example, a heating coil may input the quanta water and the quanta air. It may output the water quanta with the temperature changed, and output the quanta air with the temperature changed also.

Tools and techniques herein balance the needs of complexity with the requirements of implementation simplicity and democratizing automation to a broad set of users. As a brief overview a few of the terms are discussed in greater detail. "How am I connected?" Objects in the models know what other objects are connected to them, and what such connections entail. how they are connected. The zones in a building model know what zones are around them, and how those zones thermodynamically interact with them. The equipment in an equipment model knows what equipment and other inputs are attached to them, and how they are thermodynamically connected. This information may be represented by various questions that may be asked and answered by a system. For example, "Where am I located?" A building may literally know where it is physically in the world (longitude and latitude), and the building area (individual systems, subsystems and zones) may know where they are in relation to the other systems, subsystems, and zones. Similarly, equipment may know where it is in a building, and/or where in the building the effects of the equipment occur. "What can I do?" Equipment may understand its inputs and outputs. "How do I introspect?" A building area and the equipment in a model may know the information there is to know about itself, and may have methods to find and report on that knowledge. This allows analytics even where there are no sensors. "How do I function?" A piece of equipment understands how it works thermodynamically, and in many other ways. For example, a piece of equipment (or its representation in a computer program) may understand specifics about itself, such as, for a given piece of equipment, any errors it throws, transfer functions, pressure, energy needs, how efficiently it is running, i/o functions it may possess, and so on. "How do I talk?" The system may have protocol semantic mapping such that it understands different languages that different devices understand to communicate, e.g., BACnet, KNX, MS/TP, Bluetooth, Bluetooth (BLE) mesh, Zigbee, Z-Wave, LoRaWan, Thread, X10, Insteon, MQTT, CoAP, AMQP, DDS, HTTPm WebSocket, Modbus, Analog I/O systems, WIFI standards, etc., which it translates into an intermediate language used by the digital twin.

Some of this information may be directly input into a computer interface associated with the controller. In this interface, the building itself may be drawn or imported from another drawing package. Equipment may be placed using a point and click mechanism (or different drawing method). When the equipment is added, detailed information about the equipment, such as the protocol it uses, the manufacturer, the model, information specific to the device may also be added to a database associated with the controller. As part of the setup process, the device may be assigned to specific input locations on the controller. This assignment may be done automatically, a user may place the devices on the controller, or a combination of the two may be used. When the actual device is hooked up to the controller, the controller has enough information about the device that it can translate the input from the device into an intermediate internal language—the semantic lowering.

II. Exemplary Semantic Lowering Systems

With reference to FIG. 1, a system is shown that may be used, in whole, or in part, in any of the embodiments disclosed herein. FIG. 1 describes an example building management system incorporating innovative technology described herein to support semantic lowering. A controller 110 is disclosed, which may be part of a physical space 105. The controller 110 may control aspects of the physical space 105. The space may be a building, a portion of a building, a zone within a building, a room in a building, a floor of a building, a collection of buildings, a collection of buildings and the grounds around them, a portion of a number of buildings, and so forth. The controller may comprise a single controller housed in a single controller box, may be multiple controllers that work together, such as, for example, using distributed systems methods, and so on. These controllers may be capable of mastering the system for the physical space being modeled. At startup, the controllers may vote to elect a leader. If the internal network is damaged, a new leader may be elected, providing I.T. and built-in redundancy. Some controllers may be satellite controllers that comprise a limited set of functions of a controller 110, such as fewer device interfaces.

The physical space 105 has a plurality of devices 155, 160 that are controlled by a controller 110. The devices may be, without limitation, resources used in HVAC systems, lighting systems, entertainment systems, security systems, irrigation systems, scientific systems, stand-alone pieces of equipment, etc. These devices may be connected to the controller by being wired 170 directly to a device interface 185, 190 associated with the controller, or through a network connection 175. Some devices might have both a network and a wired connection.

Though only one controller 110 is shown, multiple controllers are also envisioned, which may be connected using one or more networks 175 such as wireless technology, wired technology, such as Ethernet, or combinations of the two. Multiple controllers may run using distributed computing techniques. They may also run using client-server networked technology, by clustering, by using distributed selfhealing net technology, etc. The controller 110 includes computer hardware 115 which itself includes at least one processor 120. The controller also includes one or more computer-readable storage media 165 such as CD's; CD-ROMs, optical disks, such as DVD-ROMs; magnetic disks, such as certain types of hard drives; memory sticks, and so on. An I/O device that further comprises a user interface 180, and/or display screen 125, is also included. Other types of I/O connections 173 such as bluetooth adapters, printers, dongles, modems, keyboards, computer mice, joysticks, trackballs, scanners, graphic tablets, microphones, speakers, etc., may also be included. Memory 130 includes computer programs 150 wherein semantic lowering may be implemented in whole or in part. This memory 130 can be any appropriate volatile or non-volatile storage subsystem.

The memory 130 also includes a physical space model 135. The physical space model 135 comprises a digital model (e.g., a space model 145 and/or a device model 140) of the physical space 105. The space model 145, in some embodiments, comprises a neural network that represent the individual material layers of the building, and physics equations that describe the way these layers behave in the world. These may be modeled by a neural network where the neurons are arranged spatially similarly to the material layers of the building. State information flows through the model following physical rules. An example of such a network that might be used herein is disclosed in, and hereby incorporates by reference the entirety of U.S. patent application Ser. No. 17/009,713, filed Sep. 1, 2020. In some embodiments, the space model comprises a different sort of machine learning algorithm, and/or a different sort of neural network.

The device model 140, in some embodiments, comprises a neural network that represents equipment, their connections, and outside influences on the equipment, such as weather. The neurons in the neural network have physics equations that describe equipment state change, and may be arranged spatially similarly to the locations of the modeled equipment in a physical space. Equipment neurons may also have state input(s) and state output(s), state parameters with values, allowable state parameter values, state input location data, and state output location data. The location data can be cross-referenced to the thermodynamic building model locations. These nodes inputs and outputs along along with the connections between the equipment form a heterogenous neural network. State information flows through the model following physical rules. An example of such a network that might be used herein is disclosed in, and hereby incorporates by reference, is the entirety of U.S. patent application Ser. No. 17/143,796, filed Jan. 1, 7, 2021.

The physical space model may operationally able to simulate devices (using the space model 145 and/or the device model) in the digital model of the physical space from a first time to a second time. The first time may be any time from the past to the future, and the second time may be any time that is after the first time. A display screen 125, in connection with a user interface 180 is operationally able to input information about system spatial layouts, e.g., building layouts, etc., information about devices, locations of devices, etc.

In an embodiment, the design of the graphics utilizes the strengths of visualization to understand how variables within a system work together, effect one another, or might behave in the future. These provide, among other benefits, ease of creating a digital twin using a simple user interface with little to no programming involved.

Media 165 may include non-transitory computer-readable media. Non-transitory computer-readable media are any available non-transient tangible media that can be accessed within a computing environment. By way of example, and not limitation, with the controller computing environment, computer-readable media include memory 130, storage (not shown), communication media, and combinations of any of the above. Computer readable storage media which may be used to store computer readable media comprises instructions 199 and data 197. Non-transitory computer-readable media does not include signals. Sources for the data may be computing devices, such as general hardware platform servers configured to receive and transmit information over the communications connections, such as network connections 175. A computing environment may be an electrical controller 110 that is directly connected to various resources, such as HVAC resources, and which has CPU, a GPU, Memory 130, input devices such as a display screen 125, and/or other features typically present in a computing environment. The computing environment may be a series of distributed computers. These distributed computers may comprise a series of connected electrical controllers.

A controller 110 is operationally able to control the devices 155, 160 This can be thought of as the nature of the controller-device relationship. A device 155, 160 is connected to a controller in such a way that the controller can change the state of the device (such as by turning it on and off, changing a setting, etc.) In some embodiments, a plurality of device data streams 170 are accepted into a plurality of device interfaces 185, 190 in a controller. The device streams 170, accepted into the device interfaces 185, 190 may have information about their character passed to the device database which can then look up more information about the device 155, 160 that the device data stream comes from. Different data streams may have different device languages and different device characteristics. Information about the device languages and device characteristics may be stored in the device database, may be stored in a computer program 150, and/or a combination of the database 195 and the computer program 150 may be used, or such information may be stored elsewhere.

In an embodiment, device 1 155, attached to a controller, such as controller 110, speaks language 1, and has characteristic 1; Device 2 160, speaks language 2 and has characteristic 2. Some devices have multiple characteristics. Different languages may be associated with different standards, such that language 1 is associated with, eg., BACnet, and language 2 is associated with, e.g., Modbus. These are discussed in greater detail with reference to FIG. 7 and the surrounding text.

III. Exemplary Semantic Lowering Method Embodiments

Figure 2:
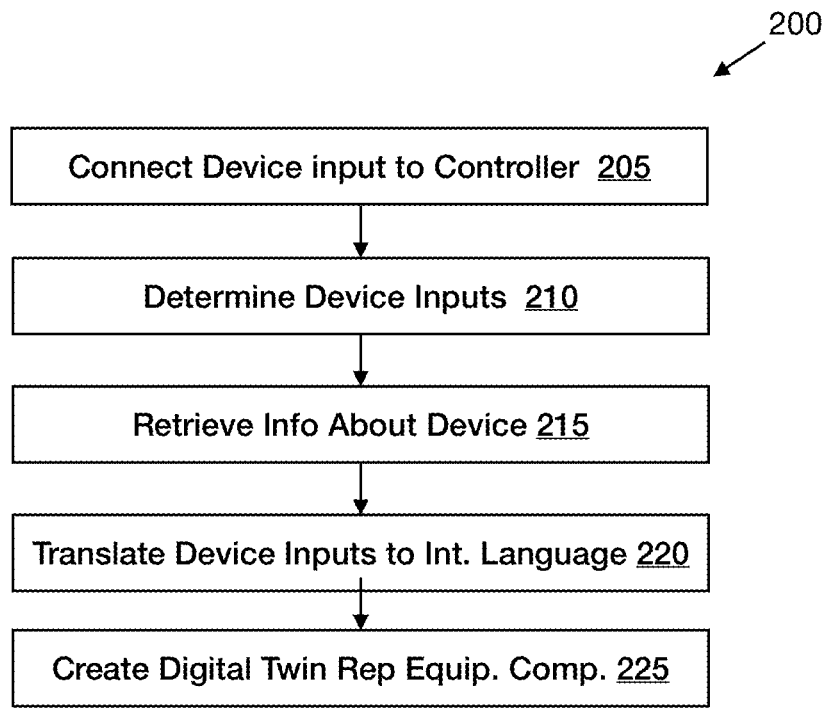
FIG. 2 depicts a flowchart showing an exemplary embodiment of a semantic lowering in conjunction which described embodiments can be implemented.

FIG. 2 illustrates an example method 200 incorporating innovative technology described herein to allow the digital model of the physical space to perform semantic lowering. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting. In some embodiments, method 200 may be implemented in one or more processing devices (e.g., a digital processor, an analog processor, a digital circuit designed to process information, an analog circuit designed to process information, a state machine, and/or other mechanisms for electronically processing information).

The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. In a given embodiment zero or more illustrated steps of a method may be repeated, perhaps with different values, sensors, controllers, or devices to operate on. Steps in an embodiment may also be done in a different order than the order that is laid out in FIG. 2. Steps may be performed in a partially overlapping manner, or fully in parallel, serially. The order in which method 200 is traversed to indicate the steps performed may vary from one performance of the method to another performance of the method. The flowchart traversal order may also vary from one method embodiment to method embodiment. Steps may also be omitted, combined, renamed, regrouped, or otherwise depart from the illustrated flows, provided that the method performed is operable and conforms to at least one claim.

At operation 205, a device is connected to a controller 110. In an exemplary system, the type of device and device location has already been entered into a computer program 150 associated with the controller, possibly using a user interface, possibly by a different method. One way of entering and/or discovering this information is shown with reference to FIGS. 5 and 6, and the surrounding text. By accessing the device, the controller can determine the inputs that the device receives, and that it gives, by turning it on and off, by trying different inputs and checking the response, etc.

At operation 210, the controller determines device input characteristics from the device. In some cases, the device location and genre of device (device type) may have already been input into a digital twin program associated with the controller 110, as discussed earlier. In such case, the controller may be able to look up information about the genre of device from a device database, from the program that information that the device was entered into, or another location. The genre of the device may be thought of as the type of device, such as the manufacture, the make, the model, etc.

At operation 215, from a database associated with the controller, information is retrieved about characteristics of the genre of device input. The device has a genre. The word "genre" may indicate type, make, model, or other type or subtype that gives information about the device. When the genre is known, the controller may be able to harvest information (e.g., from a database), about the device characteristics, and thus know how many inputs the device has, what language the device uses (e.g., BACnet, ModBus, etc.), and other information has already been input into the controller 110. With this information, the controller may be able to determine which of the device inputs matches the specific description of the individual device inputs, such that a user does not have to assign a physical device input to a specific input type.

At operation 220, using the device input characteristics and information about characteristics of the genre of device, the device input is translated into an intermediate internal language. Translation to an intermediate internal language is known by those of skill in the art.

At operation 225, using information from the database associated with the controller and the device input characteristics, a digital twin representation equipment component of the device is created. The equipment component then contains representations (the actor, quanta, and a consistent set of properties, discussed with reference to FIGS. 3-6, 8 and 9 and the surrounding text), such that the control properties for each device will be the same for digital twin model. The underlying framework of existing and currently proposed building standards are largely semantic standards. They ask the question "what is my name?" In contrast, a true ontology that understands a building system at a deep level asks "who am I?" One is a linguistic question, the other an existential one. What is the difference? Simply put, a pump in English can be labeled with the word "pump." When there is agreement as to what pumps are, they can be labeled "pump". If it is agreed that there is format which includes pumps the pump can be tagged. When an interconnect scheme is agreed upon, a system topology which includes the pump can be created. Yet for all this effort, a system still doesn't know what a "pump" actually is or what it does. And without this knowledge that a pump moves a substance through it at a speed, one can't autonomously control it, optimize it, or use it to learn new information that arises out of system behavior.

However, by defining object existentials using their underlying physics (e.g., a chair is actually a series of physics equations that define not hitting the ground, viz. $R_{Force}=Gravity \times Mass_{rear}$), meaningful purpose in context can be imputed to specific object application and control. Using such a physics format, and imputing the object purposes, a digital twin of the system may be constructed. One concept used in the creation of digital twins is that of the ontology of equipment 305.

Figure 3:
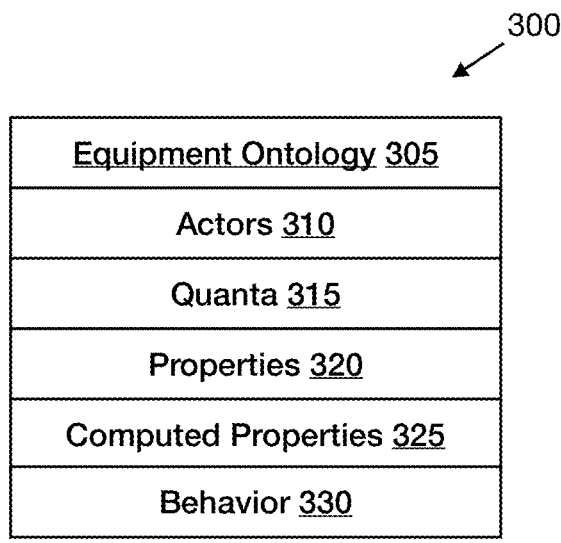
FIG. 3 depicts an equipment ontology in conjunction which described embodiments can be implemented.

FIG. 3 at 300 discloses an equipment ontology 305. An equipment ontology 305 describes equipment in a system in terms of its underlying nature. That is, it is concerned with "What it is." Naming an object, e.g., semantic tagging, just tells "how to say it." For example a "chair" is merely tagged as "chair" in English, but carries no inherent meaning. One can fundamentally define a chair not as the five letters "chair", but a gravity resistor that keeps you from hitting the ground when you sit down. The fundamental nature of a "gravity resistor" may be translated into many languages and protocols, but its existential purpose never changes. It doesn't matter if its semantic label is "chair", "throne", "couch", or "bench"—they all play the same role. More compellingly, by defining object existentials using their underlying physics (e.g., $R_{Force}=Gravity \times Mass_{rear}$) meaningful purpose for equipment may be computed in context to its application or control. FIG. 4 discloses an exemplary set of physics equations that defines a boiler, for example. After all, physics is a universal standard for defining "What", "How", and "Why". Using described embodiments one can define how sets of resources in configurations can be operated and be controlled. But perhaps more importantly, the embodiments may answer the key question for resources (or their proxy): "who am I?" If a resource can answer this existential "machine-to-self" question, it can also answer the simpler ones of machine-to-machine and machine-to-human. Those other interactions become essentially, semantic downcasting, or semantic lowering. Downcasting (or lowering) is a common programming method of casting a reference of a base class to one of its derived (sub- or leaf-) classes.

Devices are assigned an actor role which defines certain device behaviors. The different roles Actors can take will be discussed more fully with reference to FIG. 400A. A counterpart to the actors are quanta 315. Quanta 315 are packets of substance (which may be etherial, such as data) exchanged between Actors, and will be discussed with more fully with reference to FIG. 400B. Quanta can represent continuous flows, or discrete packages, but they are quantized so they can be operated on in a consistent manner. Quanta can be mechanical, with the quanta itself e.g., an amount of rotation, etc; fluid, with the quanta itself e.g., an amount of liquid, etc., control, with the the quanta itself being, e.g., a control vector, etc.; electric, with the quanta itself being an amount of electricity, etc; and so on. An Actor 310, or Quanta 315 may have Properties 320 associated with them. Properties 320 may be variables that describe features of the Actor 310 or Quanta 315. These features may be specific behavior features of the actors 310 or quanta 315 that determine how the object (actor or quanta), behaves. This is described in greater detail with reference to FIG. 4F, and the surrounding text. Properties 320A may have one or more computed properties 325A associated with them. The computed properties are equations that describe the behavior of the actor-quanta interface—quanta interact with the actor, and exit changed, or one type of quanta enter and another type exit, etc. This is also described in greater detail with reference to FIG. 4F. Behaviors 330 are the emergent properties that arise when the Actors 310 and Quanta 315 with their properties 320 and computed properties 325 interact.

Figure 4A:
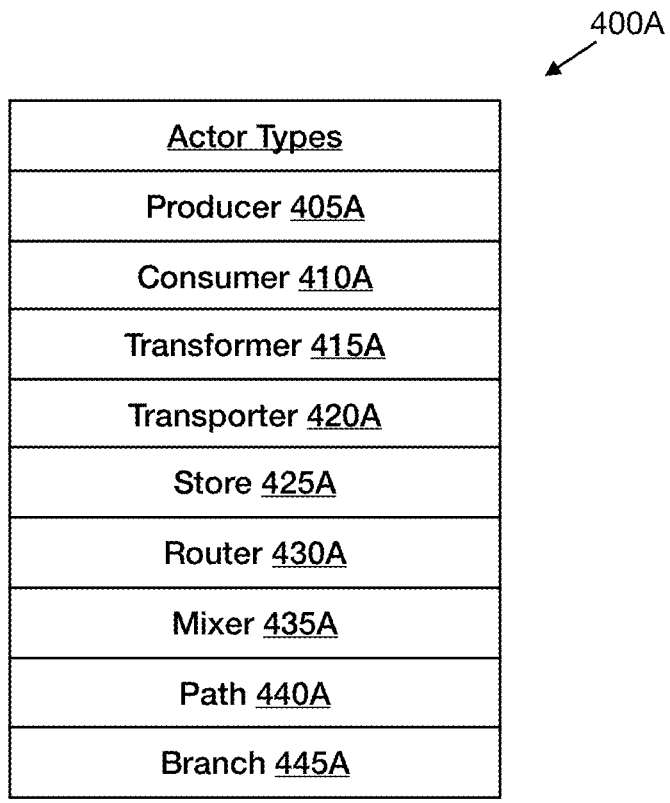
FIG. 4A depicts actor types in conjunction which described embodiments can be implemented.

FIG. 4A discloses some actor types 400A. Producers 405A are producers of Quanta 315. For example, a boiler (a producer 405A) produces heated water (a fluid quanta type 405B). Consumers 410A consume Quanta 315. For example, the boiler will consume electrical quanta; e.g., it uses electricity to run. A transformer 415A transforms one sort of quanta to another. For example, a flat plate heat exchanger transforms quanta of one sort to temperature-changed quanta of a different sort. A transport 420A moves Quanta from one Actor to another. For example, a pump moves liquid quanta, a fan moves air quanta, and a conveyer belt moves box quanta. A store 425A stores quanta. A Router 430A switches Quanta 315 from one path to another; for example, a valve, a relay, a network router and a damper. A Mixer 435A accepts two or more quanta 315 and produces a mixed quanta 315 that is a combination of the accepted quanta. A path 440A is a path though which quanta can move. Examples include a pipe, a duct, and a wire. A Branch 445A moves some quanta to a different path, such as a Tee-junction, where some quanta follow one path of the Tee-junction, and other quanta follow the other.

An actor is defined by what it does on its output quanta 315. For example, a motor as the actuator for a valve may have electrical input quanta and mechanical (rotation) output quanta. In the sense of input quanta, the motor is consumer of power. However, the motor actor type is defined based on the mechanical (rotation) quanta as the output quanta. In this sense, the motor is classified into the transport actor type as it transports the angle.; i.e, it opens or closes a valve that diverts the quanta in a specific direction. When a motor is used to actuate a pump, it produces torque which turns a pump shaft as output. So, in this specific application, a motor is considered as a producer actor.

Figure 4B:
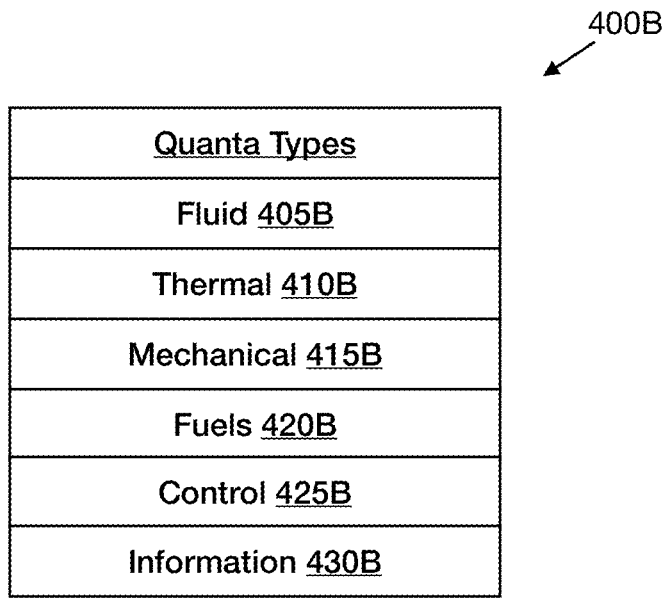
FIG. 4B depicts quanta types in conjunction which described embodiments can be implemented.

FIG. 4B discloses some quanta types 400B. Quanta, among may options, may be fluid, 405B, thermal 410B, mechanical 415B, fuels 420B, control 425B, or information 430B. Other quanta types may be added using the user interface, or a different method. A quanta has a specific way of acting within the digital twin, moving from actor to actor. For example, a fluid behaves differently while moving than information. The difference in the movement may be described with reference to physics equations, etc., known by the digital twin.

Figure 4C:
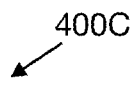
FIG. 4C depicts device input genres in conjunction which described embodiments can be implemented.

FIG. 4C discloses some device input genres 400C. Among possible device input genres are Wired Protocol 405C, Wireless Protocol 410C, Semantic Protocol 415C, and Electrical Protocol. Other device input genres protocols may be added using the user interface, or a different method.

Figure 4D:
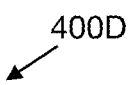
FIG. 4D depicts semantic protocols in conjunction which described embodiments can be implemented.

FIG. 4D discloses some semantic protocols 400D. Among possible semantic protocol genres are BACnet 405D, Modbus 410D, KNX 415D, N2 420D, 1-wire 425D, and one or more internal protocols 430D. Other semantic protocols may be added using the user interface, or a different method.

Figure 4E:
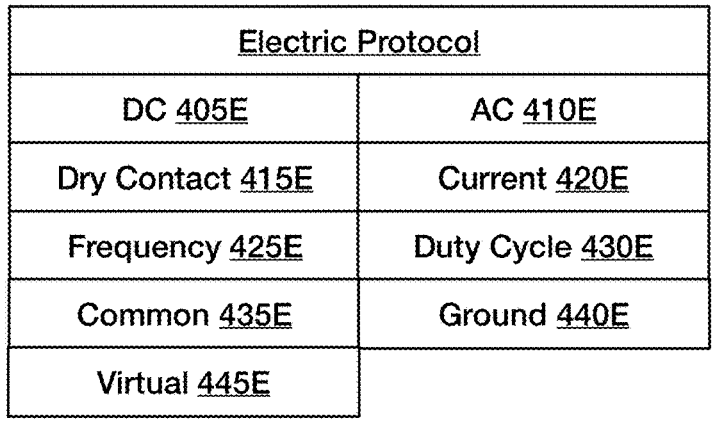
FIG. 4E depicts electric protocols in conjunction which described embodiments can be implemented.

FIG. 4E discloses some electric protocols 400E. Among possible electric protocol genres are DC 405E, AC 410E, Dry Contact 415E, Current 420E, Frequency 425E, Duty Cycle 430E, Common 435E, Ground 440E, or Virtual 445E. Other electric protocols may be added using the user interface, or a different method.

Figure 4F:
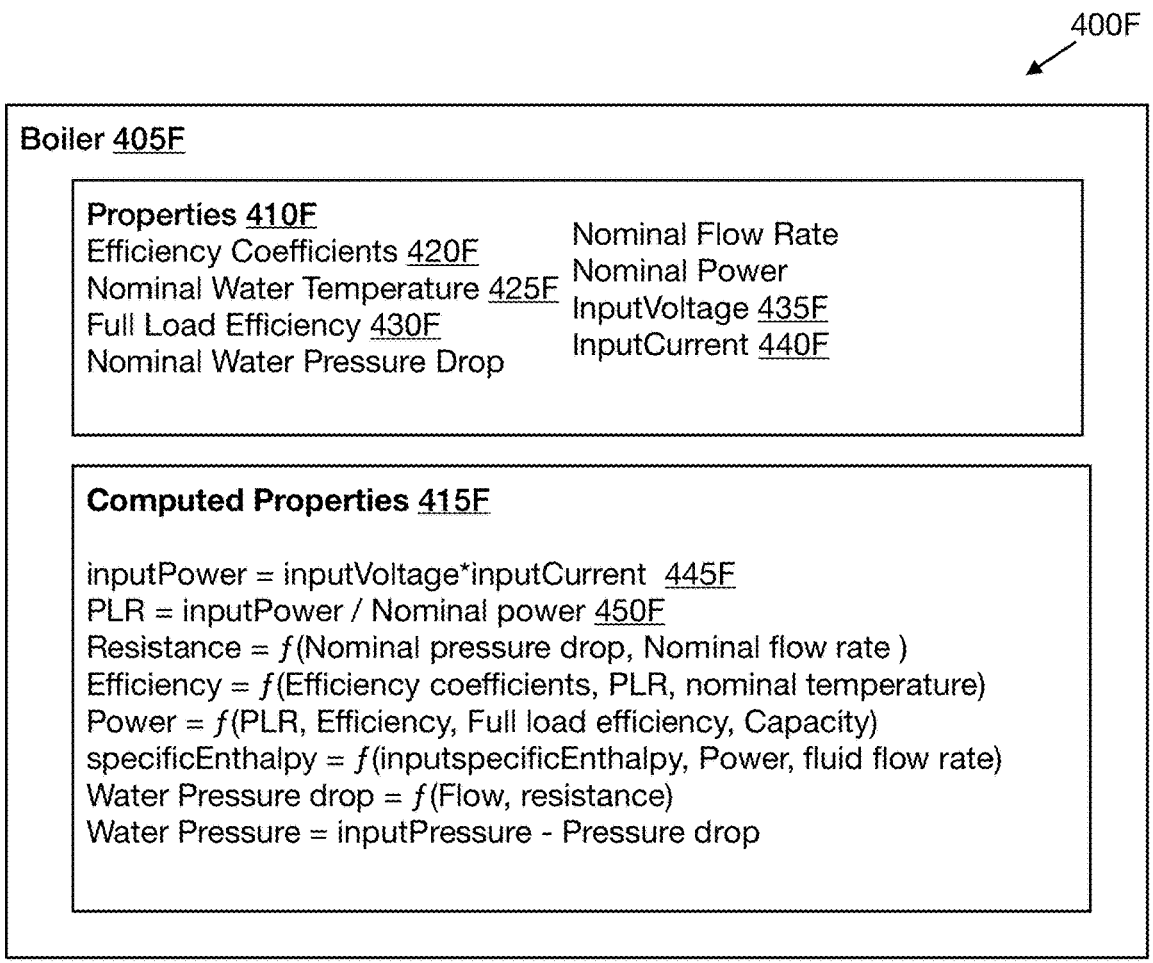
FIG. 4F depicts properties and computed properties in conjunction which described embodiments can be implemented.

FIG. 4F illustrates properties and computer properties 400F that can be used to define specific actors 400A. In the illustrated embodiment, a boiler 405F (an actor of type Producer 405A) is described by properties 410F and computed properties 415F. The properties are variables that can be tuned to describe the specificities of a particular boiler. They include, for this instantiation, Efficiency Coefficients 420F, Nominal Water Temperature 425F, and Full Load Efficiency 430F. These computed properties comprise physics equations (e.g., 445F, 450F) that interact with the properties 410F. For example, the computed property inputPower 445F is determined by multiplying the property InputVoltage 435F by the property InputCurrent 440F. Different boilers may have different properties (e.g., Efficiency Coefficients 420F, Input Voltage 435F, Full Load Efficiency 430F etc.), which will change boiler functionality without changing the physics equations (which describe basic physics facts about the essential nature of the actor in question), but will change the value of the Computed Properties 415F. Behavior 330 can be thought to be the answers to the equations in the Computed Properties 415F, which describe how the different parts of the system interact.

Figure 5:
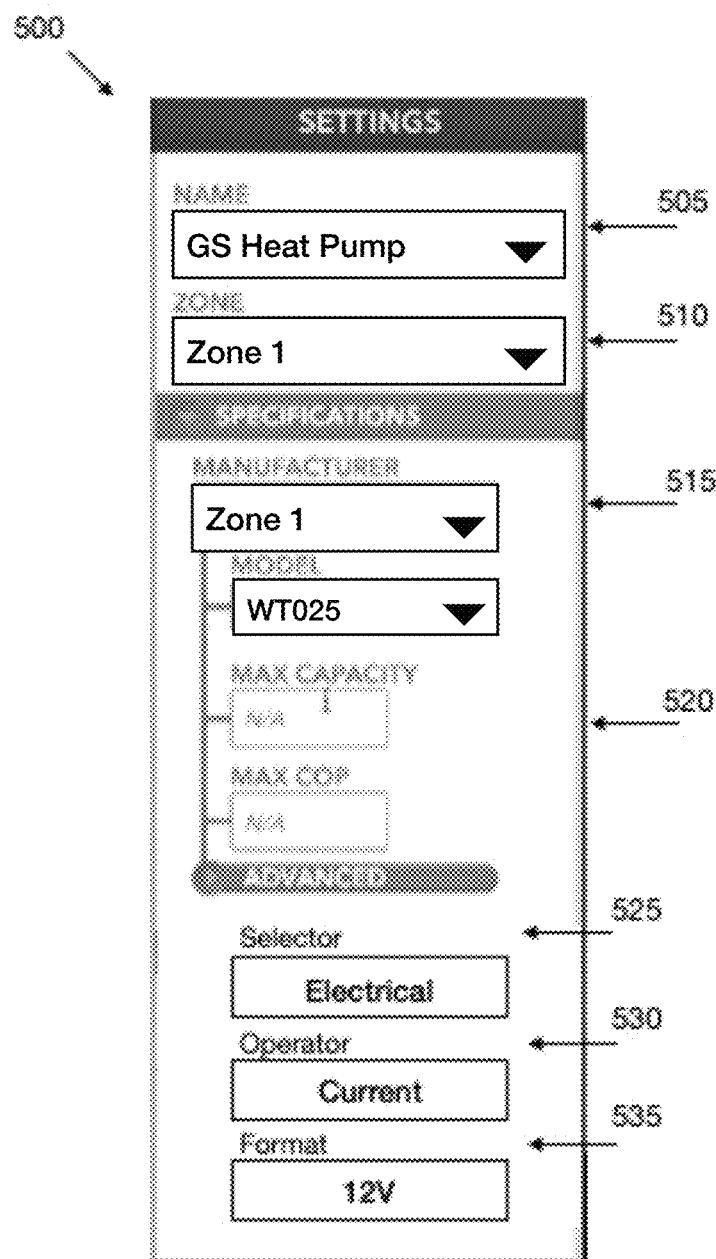
FIG. 5 discloses a possible screenshot describing device feature input.

FIG. 5 discloses a screenshot 500 that defines methods that may be used to input information about specific devices and device genres into a digital twin program. If the device genre has not been previously defined, the computer system may allow the new device genre to be defined. Once the system knows about the device genre, an instance of that device genre may be selected without the necessity for input of the associated details. A screenshot embodiment that shows user ability to define devices is shown in FIG. 5 at 500. A name can be input at 505. A zone in a building that has predefined zones can be chosen at 510. A manufacturer and model can be input at 515. Information such as maximum capacity, and other information associated with the type of device, such as Max Cop (coefficient of performance), can also be input at 520. Specific information about the inputs and outputs of the device (or a device genre 400C) may also be input. This specific information may include a selector for device input genre 525. Once the device input genre is known, a selector device (e.g., a pop-up menu) 525 (labeled "Selector" here) may allow selection of protocol types associated with the device input genre selected. For example, if the device input genre electric protocol 420C is selected, then another selector device 530 (labeled Operator here) with potential electric protocol 400E may appear. In the current example, "Current" 420E has been chosen. If further choices are possible, another selector device 535 may appear (labeled "Format" here), and so on. In the current example, 12V has been selected for the Current selected at 530. Different methods as known by those of skill in the art may also be used to display and select the input information.

Figure 6:
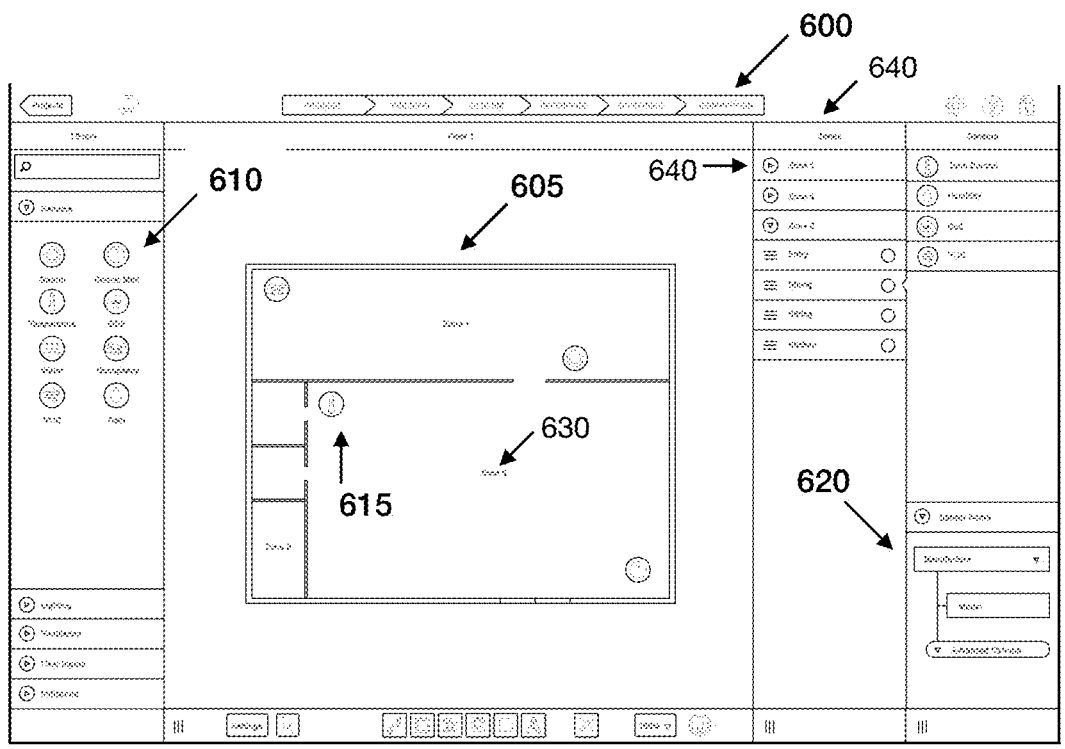
FIG. 6 discloses a possible screenshot describing device location input.

FIG. 6 discloses a screenshot 600 that defines methods that may be used to input information about devices into a digital twin program. An exemplary screen display 600 is shown that allows a user to select a predefined device genre. In some embodiments, a unique device instance may be chosen, in this exemplary instance, a sensor. A portion of a floor plan is shown at 605. Floor plan representations displayed may include some combination of walls, floors, doors, windows, and other building features. At 610, a list of predefined devices (e.g., sensors) are displayed. A user can choose a predefined device and then drag or otherwise place it 615 in a specific location within a floor plan 605. In some embodiments, a user may input a new device model using software and I/O associated with the controller, such as with an interface 620, which allows a user to input, e.g., a manufacturer, a model, and other information which may comprise specific information about how the unit model behaves. A fuller example of such device input information is shown with respect to FIG. 5 and surrounding text. After inputting the sensor within the building representation the digital twin understands from where the information from the sensor is coming. With some sorts of equipment, the equipment affects an area other than its physical location. In such instances, a zone 630 (e.g., a physical location) can be declared. There might be a list of such declared zones 640. A specific device may be then be declared to be within a specific zone e.g., zone 1 640. The device need not physically be present for its affect to be felt within this zone.

IV. Exemplary Semantic Lowering System

Figure 7:
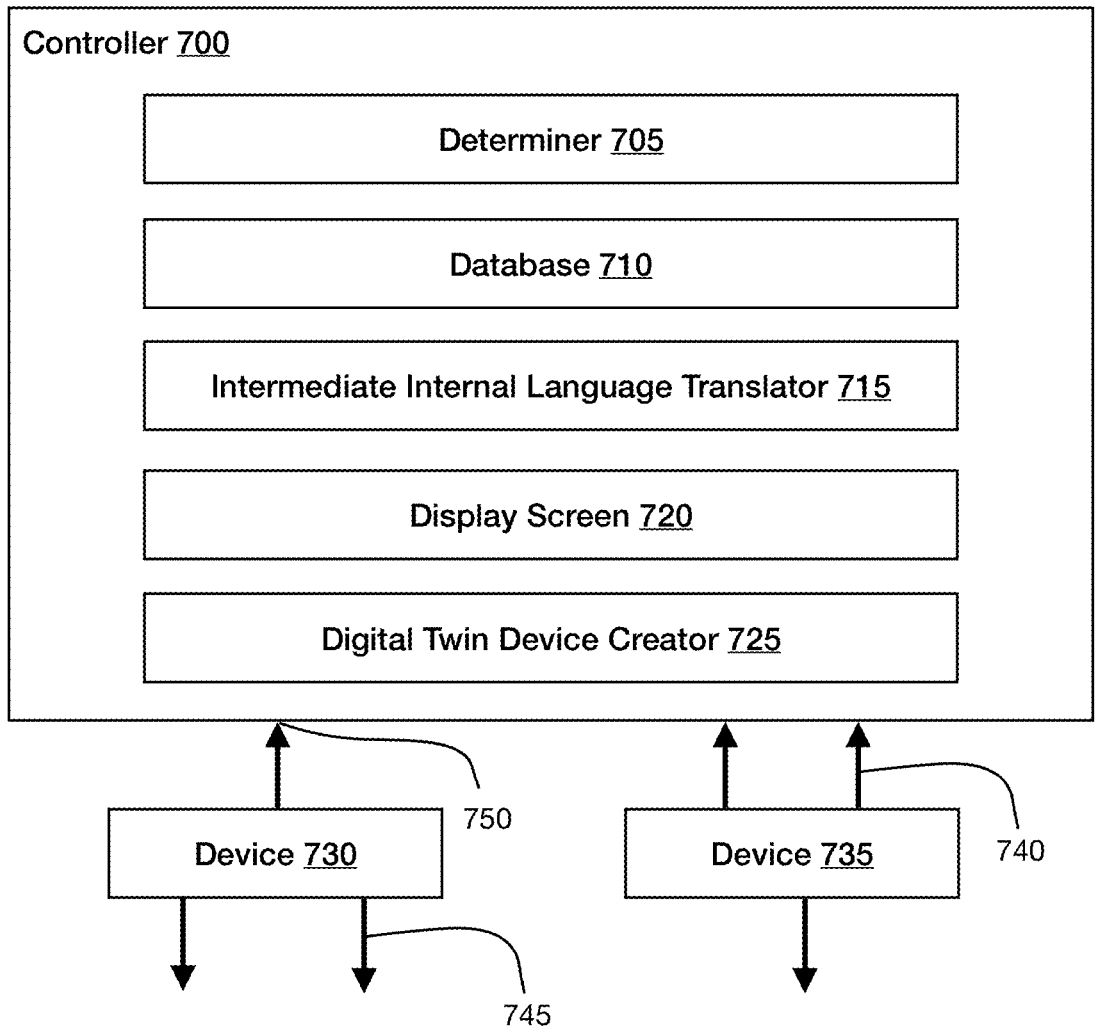
FIG. 7 depicts a functional block diagram showing an exemplary embodiment of a semantic lowering system in conjunction which described embodiments can be implemented.

With reference to FIG. 7, a system is shown that may be used, in whole or in part, in any of the embodiments disclosed herein. FIG. 7 describes an example building management system incorporating innovative technology described herein to support semantic lowering. FIG. 7 discloses a controller 700. This controller 700 may be the controller 110 shown with reference to FIG. 1. This controller may able to control a device e.g., 155, 160, the device with an input, e.g. 170, which is operationally able to attach to the controller.

A determiner 705 determines device input characteristics upon the device being attached to the controller. A database 710 associated with the controller 705 has information about a genre of the device, input about the specific device, and/or information about the location of the device within a larger system, such as the system that the controller 700 is controlling in all or in part. This information may derive from a user interface that allows users to input information about devices and device locations, as shown with reference to FIGS. 5 and 6. When a device is connected to the controller, the controller may be operationally able to determine device input characteristics. For more information, FIG. 9 describes ways that a controller can know what devices are to be connected to which controller locations. Other information derived from the device may also be able to be determined from the controller sending signals to the device and recording the outcome. An intermediate internal language translator 715 is operationally able to use some combination of the device input characteristics, the device location 750 on the controller, database information derived from the connection location, and information derived from controller input to the device to translate device information into an intermediate internal language. This may involve determining the actor that the device maps to, the type(s) of quanta that affect the device, etc. The values of the quanta may be determined (e.g., valid temperature range), the digital twin can be traversed to determine what zone the device serves, etc. The device information may include the input and output signals of the device. This allows the digital twin to understand the input(s) 740 of the device received by the controller. This also allows the output(s) 745 of the devices to be understood, e.g., through information about the device available to the controller.

Rather than dedicated bespoke drivers, a single language can translate from specific i/o languages to an intermediate language. Different I/O languages are normalized in a metasemantic way—based on the shared meanings rather than the overt differences—rather than writing special code, e.g., declarative XML code, etc. For example, all valves have position control, but the controls may work with different rules. Here, the system understands that the device being translated is a valve, the valve can be opened and closed with some set of signals. When the valve has previously been tagged with information such as a semantic protocol 400D type BACnet 405D, for example, and an understanding of the interface, e.g., stored in the database 710, the controller can discover the control language for the valve itself (e.g., a device 730, 735), and the controls for the specific valve inputs (e.g., 740, 750). For example, we know from the semantic protocol 400D what language the valve speaks. From the settings 500, the manufacturer 515 and the model, etc., information about the valve is known. For example, the controller can determine that the device 730 attached to it at a specific location 750 is a valve with, for example, six entry points. These entry points perform known functions in a known language. The controller, using the information known about the entry points stored in the database 710 can send messages in the known language to the attached device and determine from the device response at the entry point which entry point is which.

A digital twin device creator 725 is operationally able to use the device input characteristics determined by the determiner, and information about the genre of the device retrieved from the database, to create a digital twin representation of the device. The device creation may include determining what type of actor 400A it is, what quanta types 400B interface with it, its device input genre, and protocols (e.g., semantic protocol 400D, electric protocol 400E) it may have. The properties 320 and computed properties 325 determined by the digital twin device creator and/or information within the database. Once these features are known, then behavior 330 can be adduced. Once the digital device has been created, it can be integrated into a digital twin version of a space that a controller or multiple controller controls. The digital twin device representation may comprise the equipment ontology 305, the location, as well as the connections between the device and other devices.

Figure 8:
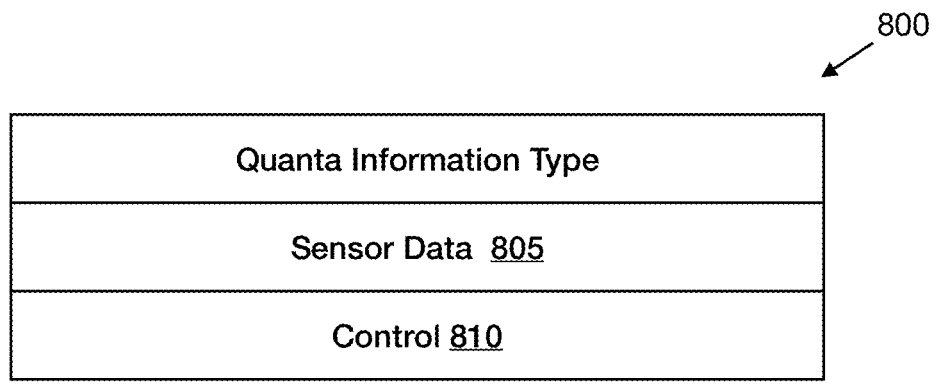
FIG. 8 depicts information quanta types in conjunction which described embodiments can be implemented.

FIG. 8 depicts quanta information types. Information is a quanta, just like gas or boxes, and so is a quanta type 400B. One way to categorize information quanta types 430B is by dividing it into sensor data 805 and control data 810. Sensor data 805 is information received by the digital twin from outside, most notably from sensors, but also from other sources. Control data 810 is, information that comes from inside the digital twin. This is, among other things, information that changes a device state, is received from a device, and/or is sent from a device. For example the information that moves a valve is control data. This move is a state change which may be controlled by the digital twin. The state change information is sent to the controller, which then moves the valve. Translation of this control information may be performed by translating the control data quanta or sensor data quanta in an equipment component. A data control component may be created to do the translation. This data control component may be pushed into an I/O pipeline. The data control component may be built as an equipment component, which is placed in an I/O component to perform the translation. Other components may also be used to perform the translation.

Figure 9:
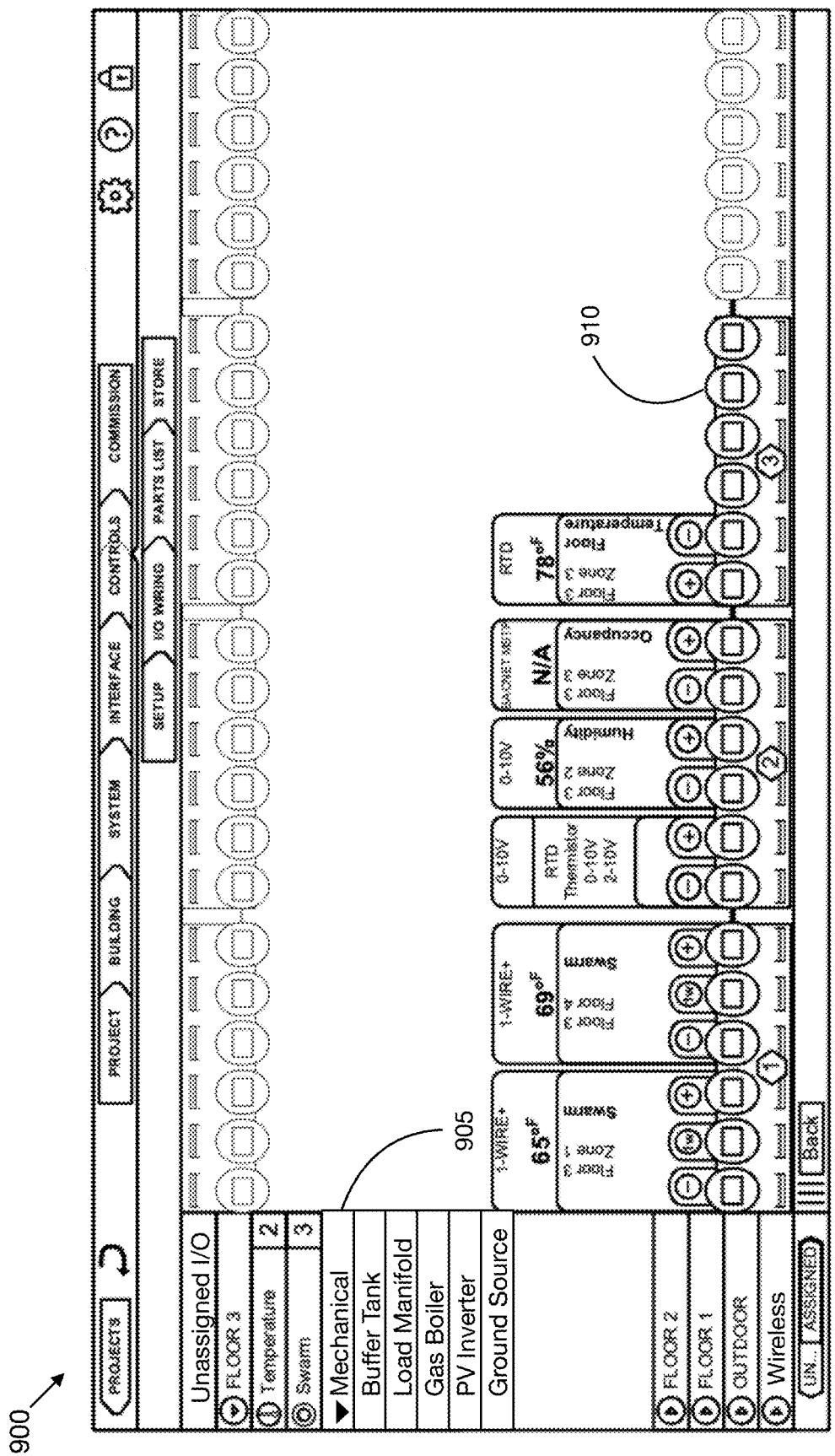
FIG. 9 depicts a screenshot with which a user using a display screen can associate a device with one or more specific locations on the controller in conjunction which described embodiments can be implemented.

FIG. 9 depicts a screen 900 with which a user using a display screen 720 can associate a device with one or more specific locations (terminals) on the controller. This location on the controller can then be associated with a specific device genre that may have information about it stored within a database 710. For an illustrative example, a user can select a device 905 from a list of genre devices 910 (in this exemplary embodiment, Buffer Tank, Load Manifold, Gas Boiler, PV Inverter, and Ground Source), and then move the chosen resource into an empty controller connection position, e.g., 910. Once this mapping has been made, the computer hardware and the programmable memory are able to determine which device should have been hooked up to which location on the controller 110, when a device appears. When a device, e.g., 730, is wired to a location 750, 910 on the controller, the controller can then determine, e.g., through a database 710, through user input, e.g., FIGS. 5 and 6, through internal mapping and device digital twin creation (e.g., FIGS. 3 through 4F), what the device is supposed to be; an more importantly, what the device does, in existential terms.

Figure 10:
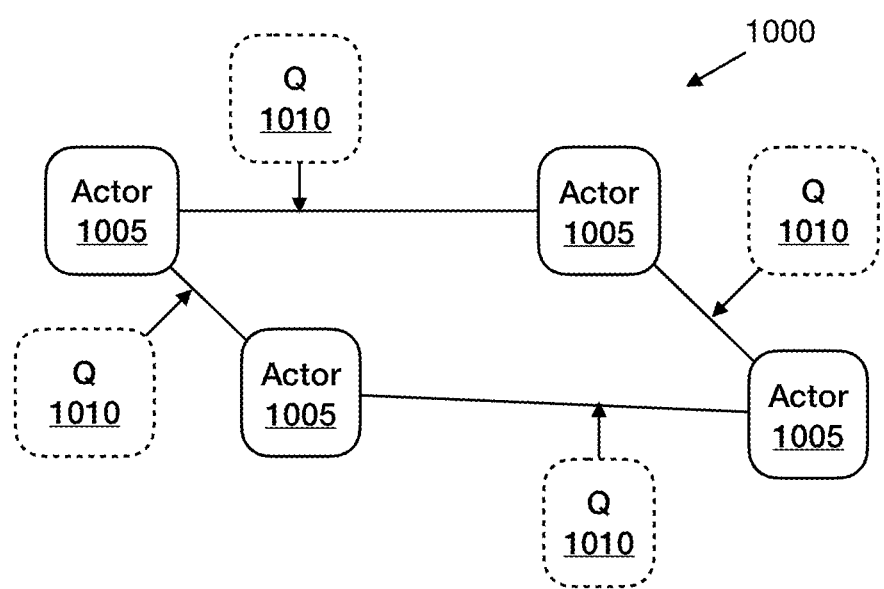
FIG. 10 depicts connected objects in an equipment ontology in conjunction with which described embodiments can be implemented.

FIG. 10 discloses a way that actors and quanta may be connected 1000. In some embodiments, actors 1005 are connected by quanta 1010, creating an interconnection net 1000. By looking at the interconnection net 1000, the connections can be determined between the different actors and which quanta travel through them. When an error occurs in one actor, by tracing through the interconnection net and looking at values in the actors, e.g., as shown with reference to 400 F, when an error is caused by a device upstream (or downstream) from the device that recorded the error, the actual error location and error reason may be able to be determined. For example, when a boiler shuts off, rather than just reporting that the boiler has shut off, information of interest around the shutoff may also be determined. For example, the boiler may be connected to a water outlet. As the system understands the connection, the water outlet can then be interrogated, i.e., examined for internal states, checked for other connections, and so on. The interrogation may show that the water outlet may have recorded a water temperature of 200° F., which would automatically cut off the water. From this, the system may be able to determine that boiler may have shut off because no water was coming into it. This error message may be recorded, along with the reason for the error (the water outlet shut down because the water going through it was too hot), the time the error occurred, and so on. The reason why the water was so hot may be able to be determined by following the interconnection net to the next actor upstream, and so on. We should be able to determine a whole story about what happened. When an event happens in the digital twin that is to be recorded, the digital twin receives a signal that an error has occurred, e.g., the boiler shut off. One may look inside the digital twin representation of the boiler, determine its actor and quanta, describe the values of the quanta (no water, e.g., a fluid quanta), walk the network connection graph to determine where the quanta comes from (e.g., discover the intake valve), determine values of the intake valve actor (e.g., determine that the water quanta was too hot, so intake valve actor was shut off), and so on. These actions are able to be performed because the system understands what the devices do, and so can make what appears to be intelligent decisions about them. While discovering all this information, the accumulated knowledge discovered can be recorded and reported. This allows the collection of information about the system that is otherwise very difficult to acquire.

In some embodiments that use neural networks to embody these ideas, actors 1005 can be thought of as equivalent to neural network nodes, while the quanta 1010 are equivalent to the weights and mapping between the nodes. Using these ideas, a neural network can be built that models the physical system of interest.

In view of the many possible embodiments to which the principles of the technology may be applied, it should be recognized that the illustrated embodiments are examples and should not be taken as a limitation on the scope of the invention. For instance, various components of systems and tools described herein may be combined in function and use. We, therefore, claim as our invention all subject matter that comes within the scope and spirit of these claims.

We claim:

1. A method performed by a controller for generalized representation of devices in a digital twin modeling a system, the method comprising:
    identifying, using the digital twin, a first action to be performed by a first device with a first device type, wherein the first action is of a first action type that is generally capable of performance by devices taking a first actor type, comprising:
        receiving from a human user via a user interface, a human language instruction to perform the first action;
        translating the human language instruction to perform the first action to an intermediate language of the digital twin to identify the first action;
        translating the first action to a first command according to a first communication protocol based on an association of the first device with a first communication protocol in the digital twin;
        translating the first device type to a first actor type representing a role taken by the first device within the system; and
        sending the first command to the first device, whereby the first device is instructed to perform the first action.

2. The method of claim 1, further comprising representing the first device within the digital twin as an entity of the first actor type and in association with a first set of device characteristics.

3. The method of claim 2, wherein the first set of device characteristics comprises an identification of the first communication protocol.

4. The method of claim 3, further comprising:
for a second device having a second device type, translating the second device type to the first actor type;
representing the second device within the digital twin in association with a second set of device characteristics, the second set of device characteristics comprising an identification of a second communication protocol;
identifying, using the digital twin, a second action of the first action type to be performed by the second device;
translating the second action to a second command according to the second communication protocol based on the association of the second device with the second communication protocol in the digital twin; and
sending the second command to the second device, whereby the second device is instructed to perform the second action.

5. The method of claim 3, further comprising:
translating the first action into a human language notification indicating that the first device will perform the first action; and
presenting the human language notification to a user via a user interface.

6. The method of claim 4, wherein the first device is a pump, the second device is a fan, and the first action type is to move substance through the system.

7. The method of claim 4, further comprising:
receiving a message from a second device according to a second communication protocol;
translating the message according to the second communication protocol to an intermediate language of the digital twin producing a translated message; and
wherein identifying, using the digital twin, a first action to be performed by the first device further comprises using information from the translated message to identify the first action.

8. The method of claim 6, wherein the first device operates on quanta of a first type and the second device operates on quanta of a second type different from the first type.

9. A non-transitory computer-readable storage medium encoded with instruction for execution by a controller for generalized representation of devices in a digital twin modeling a system, the non-transitory computer-readable storage medium comprising:
instructions for identifying, using the digital twin, a first action to be performed by a first device with a first device type, wherein the first action is of a first action type that is generally capable of performance by devices taking a first actor type, comprising:
instructions for receiving from a human user via a user interface, a human language instruction to perform the first action;
instructions for translating the human language instruction to perform the first action to an intermediate language of the digital twin to identify the first action;
instructions for translating the first action to a first command according to a first communication protocol based on an association of the first device with a first communication protocol in the digital twin;
instructions for translating the first device type to a first actor type representing a role taken by the first device within the system; and
instructions for sending the first command to the first device, whereby the first device is instructed to perform the first action.

10. The non-transitory computer-readable storage medium of claim 9, further comprising instructions for representing the first device within the digital twin as an entity of the first actor type and in association with a first set of device characteristics.

11. The non-transitory computer-readable storage medium of claim 10, wherein the first set of device characteristics comprises instructions for an identification of the first communication protocol.

12. The non-transitory computer-readable storage medium of claim 11, further comprising:
for a second device having a second device type, instructions for translating the second device type to the first actor type;
instructions for representing the second device within the digital twin in association with a second set of device characteristics, the second set of device characteristics comprising an identification of a second communication protocol;
instructions for identifying, using the digital twin, a second action of the first action type to be performed by the second device;
instructions for translating the second action to a second command according to the second communication protocol based on the association of the second device with the second communication protocol in the digital twin; and
instructions for sending the second command to the second device, whereby the second device is instructed to perform the second action.

13. A controller utilizing a generalized representation of devices in a digital twin modeling a system, the controller comprising a memory, a user interface, and at least one processor configured to:
identify, using the digital twin, a first action to be performed by a first device with a first device type, wherein the first action is of a first action type that is generally capable of performance by devices taking a first actor type, comprising:
receive from a human user via a user interface, a human language instruction to perform the first action;
translate the human language instruction to perform the first action to an intermediate language of the digital twin to identify the first action;
translate the first action to a first command according to a first communication protocol based on an association of the first device with a first communication protocol in the digital twin;
translate the first device type to a first actor type representing a role taken by the first device within the system; and
send the first command to the first device, whereby the first device is instructed to perform the first action.

14. The controller of claim 13, wherein the at least one processor is further configured to represent the first device within the digital twin as an entity of the first actor type and in association with a first set of device characteristics.

15. The controller of claim 14, wherein the first set of device characteristics comprises an identification of the first communication protocol.

16. The controller of claim 15, further comprising at least one processor configured to:

for a second device having a second device type, translate the second device type to the first actor type;

represent the second device within the digital twin in association with a second set of device characteristics, the second set of device characteristics comprising an identification of a second communication protocol;

identify, using the digital twin, a second action of the first action type to be performed by the second device;

translate the second action to a second command according to the second communication protocol based on the association of the second device with the second communication protocol in the digital twin; and send the second command to the second device, whereby the second device is instructed to perform the second action.

17. The controller of claim 16, wherein the first device is a pump, the second device is a fan, and the first action type is to move substance through the system.

18. The controller of claim 17, wherein the first device operates on quanta of a first type and the second device operates on quanta of a second type different from the first type.

19. The controller of claim 18, further comprising at least one processor configured to:

translate the first action into a human language notification indicating that the first device will perform the first action; and present the human language notification to a user via a user interface.

20. The controller of claim 19, further comprising at least one processor configured to:

receive a message from a second device according to a second communication protocol;

translate the message according to the second communication protocol to an intermediate language of the digital twin producing a translated message; and wherein identifying, using the digital twin, a first action to be performed by the first device further comprises using information from the translated message to identify the first action.

* * * * *